United States Patent [19]

Schönfeld

[11] Patent Number: 4,738,839

[45] Date of Patent: Apr. 19, 1988

[54] PROCESS FOR THE PREPARATION OF PRECIPITATED SILICA

[76] Inventor: Bernd Schönfeld, 6, Pappelweg, D-3052 Bad Nenndorf, Fed. Rep. of Germany

[21] Appl. No.: 832,262

[22] Filed: Nov. 19, 1986

[30] Foreign Application Priority Data

Dec. 6, 1985 [DE] Fed. Rep. of Germany ....... 3543172

[51] Int. Cl.$^4$ ............................................ C01B 33/12
[52] U.S. Cl. ..................................... 423/339; 423/335
[58] Field of Search ................................ 423/338, 339

[56] References Cited

U.S. PATENT DOCUMENTS 4,073,865 2/1978 Flanigen et al. ..................... 423/239

FOREIGN PATENT DOCUMENTS 0053298 5/1975 Japan ................................... 423/338
1048797 4/1976 Japan ................................... 423/338

OTHER PUBLICATIONS

Chemical Abstracts 105:28669k, Manufacture of Silica Aerosols, Eisbrenner et al., 7/28/86.
Nagaoka et al, Chem. Abs. 83:82194s (1975) (=Japanese Kokai No. 75-53298).

Primary Examiner—John Doll
Assistant Examiner—Lori S. Freeman

[57] ABSTRACT

Crystalline precipitated silica is produced by hydrolyzing silicon tetrachloride in the presence of fluoride ions at a temperature of up to 60° C.

6 Claims, No Drawings

PROCESS FOR THE PREPARATION OF PRECIPITATED SILICA

The invention relates to a process for the preparation of precipitated silica by hydrolysis of a silicon compound in an acid medium.

It is known that silicas are prepared on an industrial scale either by the wet process or pyrogenically, the preparation of precipitated silicas by the wet process predominating. Waterglass (aqueous alkali metal silicate solution) is used as the starting material for the production of precipitated silicas, and the precipitation of the silica is carried out with the aid of mineral acids, in particular sulphuric acid (see Ullmanns Encyklopadie der technischen Chemie (Ullmann's Encyclopaedia of Industrial Chemistry), 4th edition, 1982, Volume 21, page 462 et seq.). The main disadvantage of this process is the difficulty of obtaining a highly pure silica which, in particular, is free from alkali.

It is furthermore known that the preparation of alkali-free silica by hydrolysis of silicon halides is possible; however, direct hydrolysis of silicon tetrachloride always leads to the formation of a silica gel (see Gmelins Handbuch der anorganischen Chemie (Gmelin's Handbook of Inorganic Chemistry), 8th edition, 1959, Volume 15, part B, page 463). This gel has the disadvantage that it cannot be filtered without further measures.

The object of the invention is to develop a process for the preparation of precipitated silica which can be carried out in a simple manner and leads to a product which is as pure as possible.

The invention relates to a process for the preparation of precipitated silica, characterized in that silicon tetrachloride is hydrolyzed at a temperature of not more than 60° C. in the presence of a compound which donates fluoride ions, and the crystalline hydrolysis product is separated off and dried.

Commercially available silicon tetrachloride with a degree of purity of at least 99 percent by weight is used as the starting material for the process according to the invention. The use of freshly distilled silicon tetrachloride which has a degree of purity of at least 99.9 percent by weight is particularly advantageous.

The silicon tetrachloride is hydrolyzed in the presence of a compound which donates fluoride ions. Suitable compounds are, in particular, silicon tetrafluoride, hexafluorosilicic acid and, preferably, hydrogen fluoride. The hydrogen fluoride is advantageously used in the form of dilute aqueous hydrofluoric acid, the HF content preferably being 10 to 50 percent by weight. Introduction of the silicon tetrachloride into an aqueous medium in which the fluoride ions are present in an amount of 0.3 to 3, preferably 0.5 to 1.5, percent by weight is advantageous.

The hydrolysis of the silicon tetrachloride is carried out at a temperature of not more than 60° C. A temperature in the range from 20° to 50° C. is particularly advisable.

When the hydrolysis has ended, the crystalline product formed is separated off from the reaction mixture, preferably by centrifugation or filtration. If appropriate, the hydrolysis product is then washed with water.

The crystalline silica obtained by hydrolysis is finally dried. Drying is preferably carried out in two stages, and in particular initially at a temperature of 100° to 130° C., preferably 110 to 120° C., and then at a temperature of 600° to 900° C., preferably 650° to 850° C.

The precipitated silica prepared according to the invention is distinguished by a high purity. It is largely free from alkali metal salts and has an extremely low content of transition metals; in particular, the iron content is not more than 5 ppm. The silica is suitable, above all, as the base material for luminous substances and for glass optical fibres and insulating mixtures.

The following examples serve to illustrate the invention in more detail. Percentages in each case relate to the weight.

EXAMPLE 1

100 l of water were taken in a 150 litre polyethylene container, and 2 l of hydrofluoric acid (50 percent strength) were added. 30 kg of freshly distilled silicon tetrachloride (purity 99.9 percent) were stirred into this mixture in the course of 8 hours the temperature of the mixture being kept at 40° C. Thereafter, the mixture was stirred for a further 3 hours, the temperature being kept at 40° C. The silica suspension thus obtained was centrifuged and the silica separated off was washed on a filter with 50 l of water. The silica was then first dried at a temperature of 120° C. for 24 hours and then calcined at a temperature of 800° C. for 2 hours. 10.4 kg (95 percent of theory) of silica were obtained in the form of a finely crystalline powder. The iron content of the silica was 1.3 ppm.

EXAMPLE 2

1,200 l of water were taken in a 2,000 liter polyethylene container and 25 l of hydrofluoric acid (48 per cent strength) were added. 245 kg of commercially available silicon tetrachloride were stirred into this mixture in the course of 16 hours, the temperature of the mixture being kept at 45° C. Thereafter, the mixture was stirred for a further 6 hours, the temperature being kept at 35° C. The silica suspension thus obtained was centrifuged and the silica separated off was washed on a filter with 2,000 l of water. The silica was then first dried at a temperature of 110° C. for 24 hours and then calcined at a temperature of 700° C. for 3 hours. 80 kg (92.5 percent of theory) of silica were obtained in the form of a finely crystalline powder. The iron content of the silica was 1.5 ppm.

What is claimed is:

1. The process for the preparation of crystalline precipitated silica which comprises hydrolyzing silicon tetrachloride at temperature of up to 60° C. in the presence of a fluoride ion donator, separating the crystalline hydrolysis product from the reaction mixture and then drying the crystalline silica.

2. The process according to claim 1 wherein the silicon tetrachloride starting material has a degree of purity of at least 99.9 percent by weight.

3. The process according to claim 1 wherein hydrogen fluoride is the fluoride ion donator.

4. The process according to claim 1 wherein hydrolysis is in an aqueous medium in which fluoride ions are present in an amount of 0.3 to 3 per cent by weight.

5. The process according to claim 1 wherein hydrolysis is carried out at a temperature of 20° to 50° C.

6. The process according to claim 1 wherein drying is in two stages, the first stage at a temperature of 100° to 130° C. and the second stage at a temperature of 600° to 900° C.

* * * * *